United States Patent [19]
Lance et al.

[11] Patent Number: 4,516,827
[45] Date of Patent: May 14, 1985

[54] VARIABLE OPTICAL ATTENUATOR

[75] Inventors: Clyde E. Lance, Riner; Wanda S. Hutchison, Salem, both of Va.

[73] Assignee: The United States of America as represented by the Secretary of the Army, Washington, D.C.

[21] Appl. No.: 399,153

[22] Filed: Jul. 16, 1982

[51] Int. Cl.³ .................................................. G02B 5/14
[52] U.S. Cl. .............................. 350/96.15; 350/96.20
[58] Field of Search ............ 350/96.15, 96.16, 96.18, 350/96.19, 96.20, 96.21, 487

[56] References Cited

U.S. PATENT DOCUMENTS

| | | | |
|---|---|---|---|
| 1,960,090 | 5/1934 | Replogle | 350/487 X |
| 3,829,195 | 8/1974 | Rawson | 350/96.18 |
| 4,021,099 | 5/1977 | Kawasaki et al. | 350/96.21 |
| 4,063,819 | 12/1977 | Hayes | 356/152 |
| 4,094,578 | 6/1978 | DiVita et al. | 350/96.15 |
| 4,176,908 | 12/1979 | Wagner | 350/96.15 |

FOREIGN PATENT DOCUMENTS

| | | | |
|---|---|---|---|
| 2706331 | 8/1977 | Fed. Rep. of Germany | |
| 53-64532 | 6/1978 | Japan | 350/96.15 |
| 55-33129 | 3/1980 | Japan | 350/96.15 |
| 55-73002 | 6/1980 | Japan | 350/96.15 |

OTHER PUBLICATIONS

Kincaid, "Fiber Optic Data Distribution Systems Utilizing Variable Tap Ratio Optical Couplers", Appl. Optics, vol. 16, No. 9, Sep. 1977, pp. 2355-2356.
Barnoski and Morrison, "Angle Selective Fiber Coupler", Aug. 14, 1975, Applied Optics (vol. 15, No. 1, Jan. 1976).

Primary Examiner—John Lee
Attorney, Agent, or Firm—Anthony T. Lane; Jeremiah G. Murray; Edward Goldberg

[57] ABSTRACT

A device in a fiber optic system for variably attenuating the signal between optical fibers consisting of two fixedly mounted optical fibers and a moveably mounted reflective surface disposed therebetween. Light emitted from the face of the first fiber strikes the reflective surface and is redirected toward the collecting face of the second fiber. That amount of redirected light which will fall incident upon the face of the second fiber, within a predetermined angle to the optical axis of the second fiber will be transmitted through the fiber and be measured by a light detector. By moving the reflective surface calibrated amounts with respect to the faces of the fixed fibers, the amount of light incident on the face of the second fiber, and thereby transmitted, can be varied, measured and controlled.

7 Claims, 2 Drawing Figures

VARIABLE OPTICAL ATTENUATOR

VARIABLE OPTICAL ATTENUATOR

The Government has rights in this invention pursuant to Contract No. DAAB07-76-C-0377 awarded by the Department of the Army.

FIELD OF THE INVENTION

The present invention relates generally to improvements in fiber optics, and more particularly to a new, improved system for varying attenuation of optical signals coupled between optical fibers.

DESCRIPTION OF THE PRIOR ART

In the field of fiber optics, it has been the general practice to employ optical filters to achieve attenuation of an optical signal. If it was desired to vary the amount of attenuation, the filters had to be changed or replaced, causing delay and increased probability of inaccurate readings.

In the alternative, variable optical couplers could be used as attenuators. The couplers, however, often involve movement of the fibers, which again introduces a great deal of error into the system. Additionally, repeated movement of the optical fibers puts a tremendous strain on the fibers, thereby shortening the life of the system.

Previous devices useful for attenuation of optical signal coupling include the device described in U.S. Pat. No. 4,021,099, issued to Kawasaki, et al. on May 3, 1977. That patent discloses an optical coupler in which first and second optical fibers are positioned along a common axis so as to face one another at a distance "l">0. A portion of the light emitted from the first fiber enters the second fiber in an amount that varies in an inverse relationship to the varying distance "l". The coupler further includes a reflective surface facing the first fiber to reflect the remaining portion of light out of the coupler. In one embodiment, a third fiber is positioned so as to collect some of the reflected light. The variations in the amount of collected light, achieved by varying the distance "l" between the first and second fibers, are obtained by moving the first fiber with respect to the fixed second fiber along their common axis. Such movement of the fibers along a common axis is difficult to achieve with any accuracy, and puts great strain on the fibers.

A more controlled system for coupling light between two fibers is disclosed in U.S. Pat. No. 3,829,195. The device disclosed maintains a constant distance between the fibers. Each of the fibers has a first end which ideally is implanted in a respective optical segment along the optical axis of the segment. The assembly of the coupler involves placing the two segments in an aligned abutting relationship resulting in their overall length being a half wavelength of the sinusoidal path of a light beam transmitted through the system. Light travels through the first fiber and the first optical segment to the second optical segment and is wholly refocussed into the end of the second fiber. Movement of the segments, which ideally share the same optical axis, would result in less than all of the light being redirected, thereby achieving variable coupling. As in the previously recited reference, movement of the fibers is the essential mode of attenuation.

A further embodiment disclosed in the latter patent teaches a third optical segment disposed between the two segments containing the fiber ends. In this device only the third, middle segment is moved and the fiber-holding segments remain stationary.

The assembly of these devices presents accuracy problems, particularly in achieving the exact alignment of the fibers and of the segments along a common axis. In addition, the measurement of the signal attenuation in relation to segment displacement is extremely difficult.

One of the uses of measurable attenuation in a fiber optic system is simulation of and prediction of performance in a fiber optic network. Extensive testing is generally required in order to determine whether a fiber optic system can perform under the conditions of its intended and potential use. In the past, testing has required measurements over hundreds of meters of fiber optic cable for accurate reproduction of the expected line loss. Testing the system was, therefore, difficult both physically and economically.

SUMMARY OF THE INVENTION

It is therefore one of the objects of the present invention to provide an improved device for varying attenuation of the signal in an optical transmission line.

It is another object of the invention to provide a method and apparatus for variably attenuating the signal in an optical system while keeping the fibers stationary.

It is a further object that the device simulate and measure in a short optical cable the line loss that would be present in a more cumbersome and more expensive long line cable.

These and other objects are achieved in a variable attenuator which includes a first length of optical fiber fixedly mounted with a first end connected to a light source and a second end for emitting light; a second length of fixed optical fiber having a first end for collecting light and a second end connected to a light detector; and, a reflective surface positioned so that light emitted from the first fiber will strike the surface and be reflected in the direction of the collecting end of the second fiber. The reflective surface is mounted so as to be capable of being displaced by calibrated distances with respect to the fibers in order to vary the amount of light incident upon the collecting end of the second fiber.

DESCRIPTION OF THE PREFERRED EMBODIMENT

Figure 1:
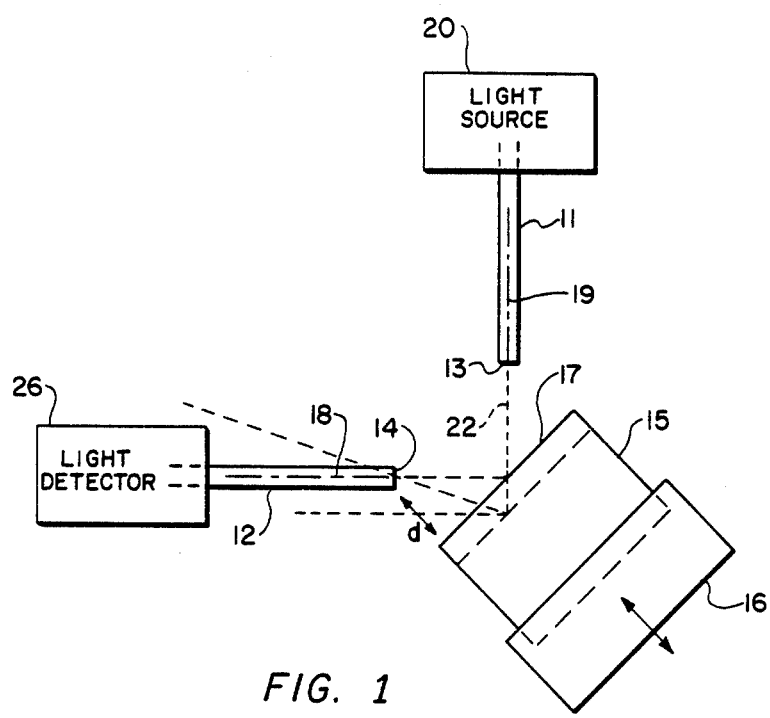
FIG. 1 is a representative side view showing a device for varying coupling of light between optical fibers in accordance with the present invention.
Figure 2:
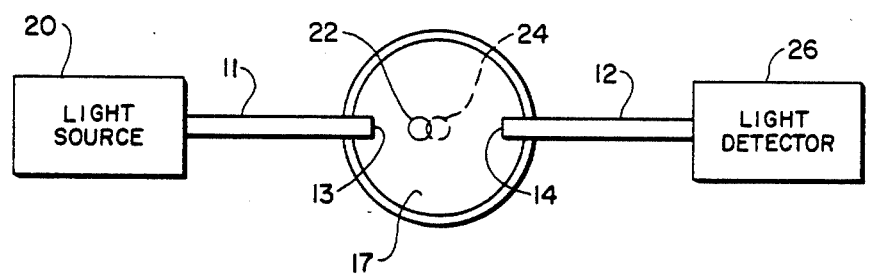
FIG. 2 is a plan view of the device showing the alignment of optical fibers and light beams, as used in the present invention, for controlling the attenuation of signals coupled between optical fibers.

As shown in FIGS. 1 and 2, a first optical fiber 11 having an output face 13, is positioned over one segment of a reflective surface 17 of a light beam director 15, such as a micrometer head or shaft. The director includes a suitable mechanism 16 such as a threaded collar, for moving the director axially to vary the position with respect to the fibers. A second fiber 12 with an input face 14 is positioned adjacent another segment of surface 17 to receive reflected light from the first fiber along axis 18. The longitudinal axes 18, 19 of the fibers are preferably arranged perpendicular to one another so that the reflective surface is at a 45° angle with respect to the fiber axes.

An optical beam transmitted by a light source 20 along the optical axis 19 of the first fiber 11 is emitted at the output face 13. The light beam 22 strikes the polished reflective surface 17 of the light beam director 15 and is reflected by the surface in the direction of the second fiber 12. The second fiber 12 is situated so as to collect the reflected light beam at its input face 14.

Dashed area 24 of FIG. 2 represents a location on surface 17 that is optically aligned with the input face 14 of fiber 12. When beam 22 completely overlaps area 24, the maximum signal will be reflected into fiber 12.

The light beam director 15 can be moved axially to and fro relative to the optical fibers 11 and 12 in order to align the output beam and receiving fiber ends to capture the maximum light signal or to adjust and vary the desired amount of the signal to be collected by the input face 14 of the second fiber 12. The range of attenuation or amount of light collected by fiber 12 will vary in proportion to the distance "l" that the light beam director is moved in relation to the faces 14 and 13 of the optical fibers 12 and 11. A suitable light detector 26 detects the intensity of light in fiber 12 for testing and measuring the attenuation of light coupled between fibers.

The reflective surface of the light beam director may be planar, parabolic, ellipsoidal, spherical, or any other appropriate shape. Its surface condition is also variable.

Various modifications are contemplated and may obviously be resorted to by those skilled in the art without departing from the spirit and scope of the invention as hereinafter defined by the appended claims.

What is claimed is:

1. A variable optical attenuator comprising:

first and second optical fibers having respective longitudinal axes disposed at an angle and a pair of respective ends positioned adjacent and spaced from one another, said first fiber having an output face at one said end for emitting light, said second fiber having an input face at said adjacent end for collecting light;

light beam director means having a uniformly reflective surface positioned proximate to and spaced from said ends for reflecting light emitted from said output face to said input face and having a longitudinal axis extending in a direction between said axes of said fibers; and adjustable holding means for supporting and mechanically adjusting movement of said light beam director to and fro along the longitudinal axis thereof to a continuously selectable position in a path between said end faces to determine the spacing of said reflective surface from said ends and the amount of light incident upon said input face, said adjustable holding means having a longitudinal axis coinciding with said light beam director axis, the entire length of said adjustable holding means being freely moveable therealong.

2. The variable optical attenuator of claim 1 including a source of light at the opposite end of said first fiber and light detection means at the opposite end of said second fiber for detecting the amount of light reflected from said source and measuring the light attenuation between said fibers.

3. The variable optical attenuator, as recited in claim 1, wherein said fibers are fixedly mounted.

4. The variable optical attenuator, as in claim 1, wherein said light beam director includes a planar reflective surface.

5. The variable optical attenuator, as in claim 1, wherein said fibers are positioned at a 90° angle with respect to each other and said light beam director surface is at a 45° angle with respect to each fiber axis.

6. The variable optical attenuator, as recited in claim 1, wherein said adjustable holding means for supporting and adjusting movement of said light beam director includes a rotatable threaded collar.

7. A method of variably attenuating a signal in an optical fiber system including a source of light and light detection means, comprising the steps of:

mounting two optical fibers such that the longitudinal axes are at an angle and a pair of respective ends of said fibers are positioned adjacent and spaced from one another, one of said ends being adapted to emit light passing through one of said fibers from said source and the adjacent end of the other fiber having an input face adapted to receive light;

positioning a moveable uniformly reflective surface means adjacent and spaced from said ends such that light emitted from said one end of said one optical fiber will fall incident upon said reflective surface and be redirected into the input face of said adjacent end of said other optical fiber;

mechanically and selectively moving the reflective surface means to and fro along the longitudinal axis thereof in a path between said ends to permit continuous selective adjustment of the distance between said optical fiber ends and the reflective surface means to control the amount of light redirected into said input face of said other optical fiber; and measuring the amount of light attenuation between said fibers.

* * * * *